United States Patent
Rubinstein

[15] 3,676,571
[45] July 11, 1972

[54] ELECTRICAL OUTLET BOX

[72] Inventor: Solomon Rubinstein, Fanwood, N.J.

[73] Assignee: General Cable Corporation, New York, N.Y.

[22] Filed: March 10, 1971

[21] Appl. No.: 122,735

[52] U.S. Cl.................................................174/65, 220/3.92
[51] Int. Cl. ............................................................H02g 3/08
[58] Field of Search ................174/53, 58, 65; 220/3.2, 3.3, 220/3.4, 3.5, 3.6, 3.7, 3.8, 3.9, 3.92, 3.94

[56] References Cited

UNITED STATES PATENTS

| | | | |
|---|---|---|---|
| 1,929,218 | 10/1933 | Sambleson............................220/3.94 |
| 1,225,525 | 5/1917 | Sweet....................................220/3.92 |
| 1,963,951 | 6/1934 | Bowers..................................220/3.92 |
| 1,901,943 | 3/1933 | Adell......................................220/3.2 |
| 1,154,576 | 9/1915 | Maison et al. .........................220/3.92 |

Primary Examiner—Lewis H. Myers
Assistant Examiner—D. A. Tone
Attorney—Sandoe, Hopgood & Calimafde

[57] ABSTRACT

This electrical outlet or switch box is of two piece construction. One piece is the body which has an open front and an open back. A separate back plate incorporates the cable clamps and a ground wire terminating screw. This back plate attaches to the box after the cables have been connected to the back plate and after different connections between the cables have been made. It is particularly useful for preterminated wiring harnesses for factory built homes.

11 Claims, 2 Drawing Figures

PATENTED JUL 11 1972  3,676,571

INVENTOR
Solomon Rubinstein
BY
ATTORNEYS.

ELECTRICAL OUTLET BOX

BACKGROUND AND SUMMARY OF THE INVENTION

Electrical outlet boxes are ordinarily made in one piece and they are attached to studs when a building is framed. Cables for wiring the building are pulled through studs and joists and then terminated in the boxes. The electrical outlet box of this invention can be used in the same way as conventional boxes, if desired; but it can also be used in factory built housing with predetermined wiring harnesses.

The electrical outlet box of this invention is of two piece construction. It has an open front and an open back. A separate back plate can be attached to the back of the body and this back plate has cable clamps and a ground wire terminating screw.

One or more cables can be attached to the back plate without the necessity of threading the cables through the conventional one piece boxes. It is also possible to have a device terminated to a cable before the cable is inserted in the box. The back plate is attached quickly to the box in a convenient manner as will be explained. Once the back plate has been attached, it cannot be loosened or removed from the front of an installed box but if replacement of a device is necessary at some later date it can be done in the same manner as with present conventional one piece boxes.

The two piece box of this invention lends itself to making up of preterminated wiring harnesses for factory built homes. In such cases the boxes are usually attached to the wall studs when wall panels are fabricated as sub-assemblies. The wiring is done after the panels are assembled to form a module. Using a wiring harness, in which the cable ends are preterminated, greatly facilitates the wiring of the module and speeds the module production line. With the box of this invention the back plate constitute a part of the wiring harness and they are attached to the appropriate boxes of the module when the wiring harness is assembled with the other part of the module.

Aside from this use of the invention for factory built homes, the box of this invention has outstanding advantages for wiring of on-site construction wherein cables are individually pulled through studs and joists and then terminated in boxes. It is much more convenient to terminate such cables on a back plate of the boxes of this invention and then secure the back plate to the box than to pull cable into the box and terminate them when working within the narrow confines which the box imposes.

The body of the box of this invention has openings which extend to the rear edge of the box, or has such openings closed by pry-outs, and these openings provide clearance for the cables when the back plate is brought into position to assemble with the rest of the outlet box.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
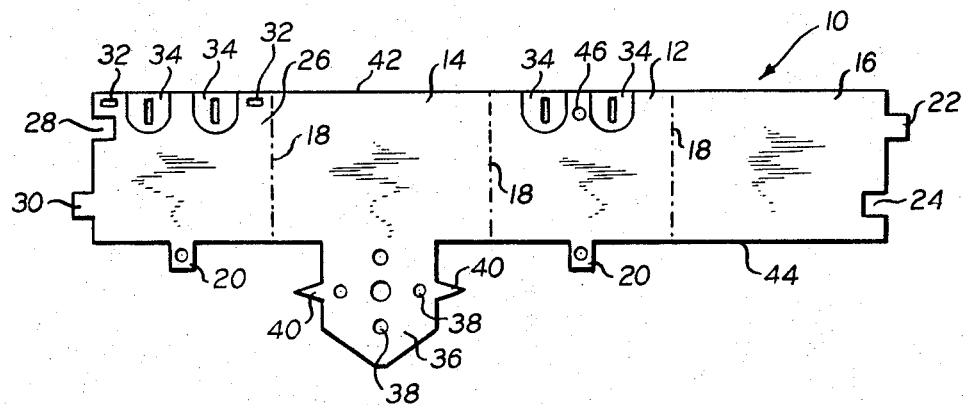
FIG. 1 is a view of a blank from which the body of the outlet box of the invention is constructed.

FIG. 1 shows a blank 10 which is preferably made of metal or equivalent material. This blank constitutes a number of panels. There is a top panel 12 which joins with side panels 14 and 16 at locations indicated by broken lines 18. These broken lines 18 are the locations at which the blank 10 is bent to form the body of the box as will be explained in connection with FIG. 2. There is a forwardly extending lug 20 at one end of the top panel 12. There is a tab 22 at the free end of the side panel 16 and a recess 24 in the free end at a spaced location from the tab 22.

A bottom panel 26 is located at the side of the panel 14 remote from the panel 12 and these panels 14 and 26 merge at one of the line 18. The free end of the bottom panel 26 has a recess 28 in position to receive the tab 22 when the panel is bent to form the box; and also has a tab 30 in position to engage the recess 24 when the box is set up.

The bottom panel 26 has socket openings 32 near its opposite sides and it has two pry-outs 34 located between the socket openings 32 and symmetrical about the fore-and-aft center line of the bottom panel 26. There is a lug 20 extending from the other side of the panel 26 which is the same as the lug 20 of the top panel 12.

A bracket panel 36 extends from the front of the side panel 14 and this bracket panel has openings 38 for receiving fastening means for installing the box and also has projections 40 which can be bent over to serve as nails for attaching the bracket 36 and the box to a stud of a building frame.

A longitudinal edge 42 of the blank 10 becomes the back edge of the box, and a longitudinal edge 44, which is parallel to the edge 42, becomes the front edge of the box. There are pry-outs 34 in the top wall panel 12 and there is an opening 46 through the top panel 12 between the pry-outs 34 at a center location near the back edge of the top penal 12 for receiving a screw which holds the back plate of the box in assembled relation with the body of the box. This opening 46 is preferably threaded, or it can be smooth and the threads provided on a top lug of the back wall as will be explained.

Figure 2:
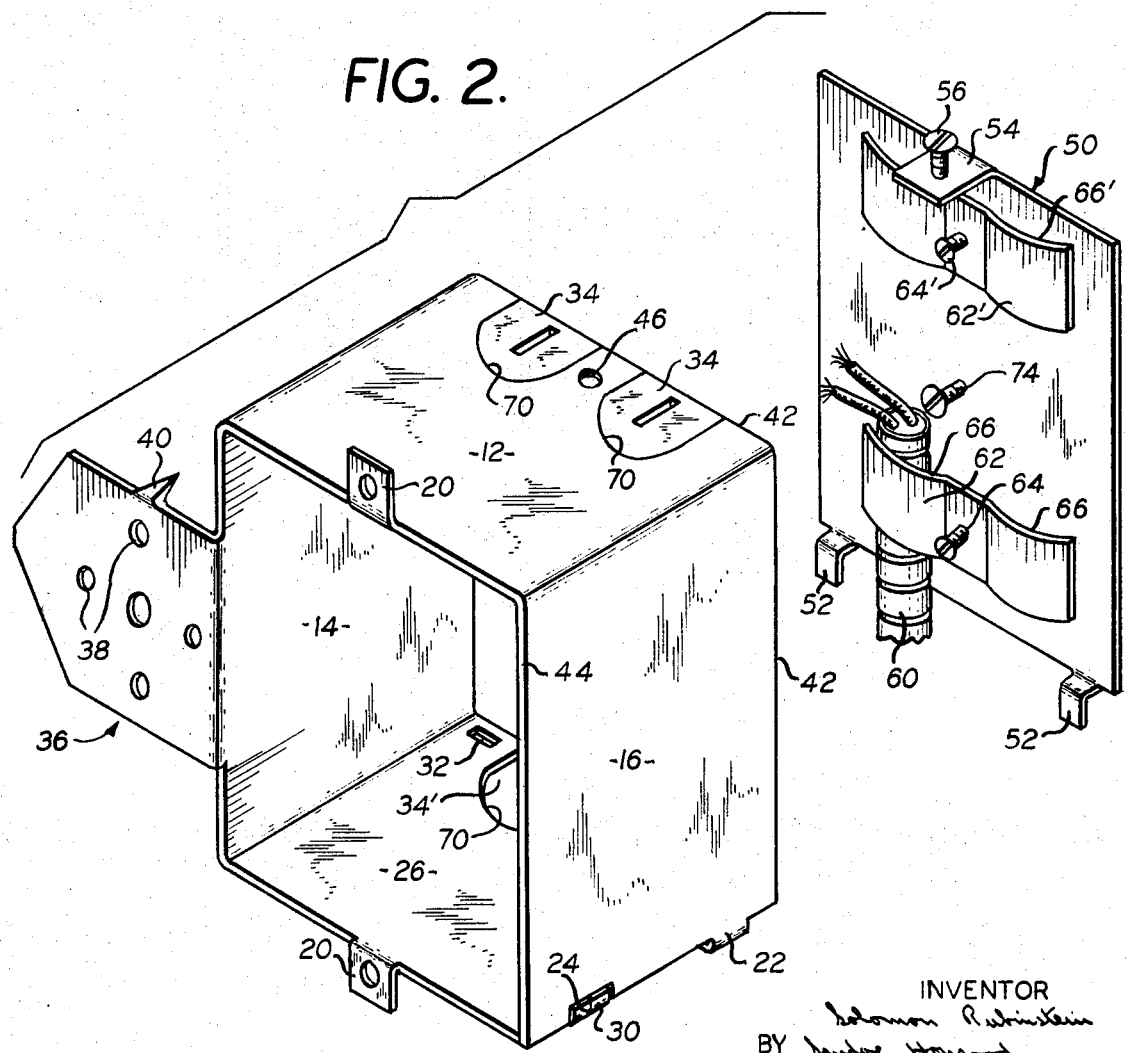
FIG. 2 is an isometric view showing a box body made from the blank shown in FIG. 1 and showing a back plate with one cable secured to it and with the back plate not yet assembled with the body of the box.

FIG. 2 shows the blank 10 after it has been bent to form the body of the outlet box. The top, bottom and side walls of the set-up box in FIG. 2 are indicated by the same reference characters as the panels of the blank since they constitute the same physical structure. The side walls 14 and 16 preferably make right angles with the top and bottom walls 12 and 26, respectively. Bracket 36 is bent so that it extends in a plane normal to the plane of the side wall 14. The lugs 13 are also bent at right angles to their panels. These lugs are used for connecting a face plate to the box in accordance with conventional practice.

The projections 40 are bent at right angles to the bracket 36 so that they can be used as nails for holding the box on a stud if no nails are to be inserted into the openings 38. This feature is a conventional construction.

FIG. 2 shows a back wall 50 which is wide enough to extend across the open back of the body of the box and to also extend across the edges 42 of the side walls 14 and 16 and of the top wall 12.

The back wall 50 has detachable fastening means for connecting it to the body of the box. These detachable fastening means include two offset lugs 52 which extend forwardly and then downwardly at locations to fit into the sockets 32 of the bottom wall 26. There is a connector at the upper end of the back wall 50 for holding the back wall against relative movement of the lugs 52 with respect to the socket 32. This connector comprises a forwardly extending lug 54 with a fastening such as a screw 56 that extends through the lug 54 and into the opening 46 in the top wall 12 in the body of the box. The screw 56 can be threaded through an opening in the lug 54 or can be threaded into the opening 46 of the box body, or threads can be provided in both openings if desired.

Before the back wall 50 is attached to the body of the box, cables are brought to the back wall and terminated as necessary for the wiring system. FIG. 2 shows one cable 60 extending upwardly across the front face of the lower end of the back wall 50 and attached to the back wall by anchoring means.

The anchoring means include a bracket 62 spaced from the front face of the back wall 50, and clamping means 64 which are shown in the drawing as a screw passing through the bracket 62 at a center location and threading into a complementary aligned opening in the back wall 50. Screw 64 is used to pull the bracket 62 toward the back wall 50 and to thereby clamp the armor of cable 60 firmly between the bracket 62 and the back wall 50. There is a similar bracket 62' near the upper end of the back wall 50 with clamping means comprising a screw 64'. Each of the brackets 62 and 62' has a curved portion 66 which does not have the same curvature as the armor of the cable 66, in the illustrated construction, but which does serve to center the cable in the bracket 66 as clamping pressure is applied. The box is used in the same way to clamp non-metallic sheathed cable when such cable is used.

The brackets 62 and 62' are located in alignment with the pry-outs 34. FIG. 2 shows the body of the box with the pry-out corresponding to the location of the cable 60 removed from the bottom wall 26 so that there is an opening 34' providing clearance for receiving the cable 60 when the back wall 50 is brought into position against the back of the box and is attached to the back of the box.

It is an important feature of the construction that the openings provided by the pry-outs 34 have their forward edges preferably shaped to correspond in radius with the radius of the armor of the cables with which the box is intended to be used. This forward edge, indicated by the reference characters 70 in FIG. 2, is of approximately 180° in extent and the center of curvature of these semi-circular edges for each pry-out is preferably located ahead of the back edge 42 for a distance equal to the radius of curvature of the edges 70 which is substantially the same as the radius of the cable 60. The edges of the pry-out openings beyond the ends of the semi-circular front edges 70 are substantially tangent to the ends of the circular edges 70 and extend parallel to each other all the way to the back edge 42 of the top wall. Thus the pry-out openings are wide enough at their rearward end to admit the cable 60 and when the back wall is attached to the body of the box, it holds the cable against the front edges 70 of the pry-out openings or in substantial contact with these edges.

Because of the fact that the cables 60 can be assembled with the back wall 50 at a location remote from the body of the box, and can then be brought through the openings in the walls of the body of the box without having a free end of the cable available as with conventional one piece boxes, this invention lends itself to use with free terminated wiring harnesses, as previously explained.

The back wall 50 is also provided with a screw 74 which threads into the back wall 50 and which provides a terminating connection for a ground wire which forms a part of the wiring harness.

The preferred embodiment of the invention has been illustrated and described, but changes and modifications can be made and some features can be used in different combinations without departing from the invention as defined in the claims.

What is claimed is:

1. An electrical outlet box including top, bottom and side walls connected together and forming a housing open at the front, a back wall for closing the back of the box, one wall of the box constituting a different piece from the rest of the box, detachable fastening means for securing said one wall to the box, and anchoring means on said one wall of box and on a side thereof to clamp wires in position for connection with other conductors on the inside of the box whereby electrical cables can be secured to said one wall of the box before said one wall is secured to the box.

2. The electrical outlet box described in claim 1 characterized by said one wall being the back wall of the box and some one of the top, bottom and side walls of the box having an opening therein for passage of a cable into the box, the opening having a cross-section to receive the cable with which the box is intended to be used, and said opening extending to the back edge of the box and having a width at the back edge of the box substantially equal to the diameter of the cable for bringing wires into the box that are attached to the back wall when the back wall is separated from the rest of the box.

3. The electrical outlet box described in claim 1 characterized by the back wall being a different piece from the other walls and the anchoring means being on the inside surface of the back wall and the detachable fastening means including sockets and a complementary lug that locks into a socket, part of the fastening means being at the rearward end of one of the walls of the box and another part of the fastening means being near one edge of the back wall, and a connector at another part of the back wall for holding the back wall against relative movement of the lug and socket.

4. The electrical outlet box described in claim 3 characterized by the fastening means including two sockets that are holes in the bottom wall of the box, and two lugs extending from the bottom edge of the back wall and offset from the plane of the back wall, and a forwardly extending lug at the top of the back wall extending close to and generally parallel to the top wall of the box, and a connector that secures the forwardly extending lug to the top wall.

5. The electrical outlet box described in claim 1 characterized by the back wall being a different piece from the other walls and the anchoring means being a bracket located in front of the back wall and connected to the back wall, and clamping means that pull the bracket toward the back wall to clamp a cable between the bracket and the back wall.

6. The electrical outlet box described in claim 5 characterized by the back wall being flat and there being brackets spaced from the front surface of the back wall near the upper and lower ends of the back wall, the clamping means being screws extending through the brackets and threaded into the back wall.

7. The electrical outlet box described in claim 1 characterized by the back wall being a different piece from the other walls and the detachable fastening means including offset lugs extending forwardly and then downwardly from the bottom edge of the back wall, openings through the bottom wall in a position to receive the lugs of the back wall, the back wall being wide enough to extend across the back edges of both of the side walls, and a forwardly extending lug at the top of the back wall in position to extend parallel to and across the top surface of the top wall, the back wall being high enough to extend across the back edge of the top wall, and a screw that extends through aligned openings in the top lug and the top wall for holding the back on the box.

8. The electrical outlet box described in claim 7 characterized by the anchoring means being clamps on the inside of the back wall, and pry-outs in one of the walls of the box at the back portion of the wall and extending all the way to the back edge of the wall so that removal of a pry-out leaves a recess in the back edge of the box which provides clearance for a cable held by the anchoring means, which recess is closed at the back edge of the box when the back wall is connected to the box.

9. The electrical outlet box described in claim 7 characterized by their being two pry-outs in the bottom wall between the openings in the bottom wall that receive the lugs of the back wall, and there being two pry-outs in the top wall one on each of the opposite sides of the screw opening for fastening the top lug to the back wall, and the anchoring means including as many clamps as there are pry-outs, there being a clamp in line with each pry-out.

10. The electrical outlet box described in claim 1 characterized by the back wall being a different piece from the other walls and the top, bottom and side walls constituting a single piece of metal and adapted to be formed from a flat blank, front and back edges of the walls extending generally parallel to one another and adapted to be longitudinal edges of the blank, the box having corners where the side walls join the top and bottom walls and all but one of the corners being bends in the continuous extent of the metal of the walls, and the other corner having a tab and a recess that is engaged by the tab in locking relation with the recess to hold the walls secured together at said other corner, the tab being part of said single piece of metal.

11. The electrical outlet box described in claim 10 characterized by a bracket extending generally normal to one wall of the box and substantially in a plane with the front edges of the box and of one piece with the walls of the box, and sharp projections extending rearwardly from edges of the bracket to serve as nails for securing the box to a stud, and openings in some of the walls having forward edges of substantially 180° extent with a radius of curvature substantially equal to the radius of the armor of the cable with which the box is intended to be used, the center of curvature of said forward edge being ahead of the back edge of the box by a distance substantially equal to the radius of the curvature, and said openings having side edges parallel to one another and generally tangent to the rearward ends of the forward edge and extending to the rear edge of the box whereby said openings have a width at the rearward ends substantially equal to the diameter of said armor.

* * * * *